United States Patent
West

(10) Patent No.: US 8,504,598 B2
(45) Date of Patent: Aug. 6, 2013

(54) DATA PERTURBATION OF NON-UNIQUE VALUES

(75) Inventor: John Randall West, Sunnyvale, CA (US)

(73) Assignee: Information Resources, Inc., Chicago, IL (US)

( * ) Notice: Subject to any disclaimer, the term of this patent is extended or adjusted under 35 U.S.C. 154(b) by 122 days.

(21) Appl. No.: 12/020,740

(22) Filed: Jan. 28, 2008

(65) Prior Publication Data

US 2008/0263065 A1 Oct. 23, 2008

Related U.S. Application Data

(60) Provisional application No. 60/886,798, filed on Jan. 26, 2007.

(51) Int. Cl.
*G06F 17/30* (2006.01)

(52) U.S. Cl.
USPC .......................... 707/954; 707/607; 715/739

(58) Field of Classification Search
USPC ........... 707/736, 741, 750, 999.003, 999.005, 707/954, 607; 704/9; 715/231, 739; 705/10
See application file for complete search history.

(56) References Cited

U.S. PATENT DOCUMENTS

| | | | |
|---|---|---|---|
| 4,908,761 A | 3/1990 | Tai | |
| 5,548,749 A | 8/1996 | Kroenke et al. | |
| 5,675,662 A | 10/1997 | Deaton et al. | |
| 5,726,914 A | 3/1998 | Janovski et al. | |
| 5,737,494 A | 4/1998 | Guinta et al. | |
| 5,758,257 A | 5/1998 | Herz et al. | |
| 5,819,226 A | 10/1998 | Gopinathan et al. | |
| 5,884,305 A | 3/1999 | Kleinberg et al. | |
| 5,966,695 A | 10/1999 | Melchione et al. | |
| 5,974,396 A | 10/1999 | Anderson et al. | |
| 5,978,788 A | 11/1999 | Castelli et al. | |
| 6,073,112 A | 6/2000 | Geerlings | |
| 6,163,774 A | 12/2000 | Lore et al. | |
| 6,233,573 B1 | 5/2001 | Bair et al. | |
| 6,282,544 B1 | 8/2001 | Tse et al. | |
| 6,401,070 B1 | 6/2002 | McManus et al. | |
| 6,556,974 B1 | 4/2003 | D'alessandro | |
| 6,642,946 B1 * | 11/2003 | Janes et al. .................. 715/854 |
| 6,708,156 B1 | 3/2004 | Gonten | |
| 6,920,461 B2 * | 7/2005 | Hejlsberg et al. .................. 1/1 |
| 6,928,434 B1 | 8/2005 | Choi et al. | |

(Continued)

FOREIGN PATENT DOCUMENTS

| | | |
|---|---|---|
| WO | WO-2008/092147 A2 | 7/2008 |
| WO | WO-2008/092147 A9 | 7/2008 |
| WO | WO-2008092147 A2 | 7/2008 |
| WO | WO-2008092149 A2 | 7/2008 |

OTHER PUBLICATIONS

Yves Bernard, "Perturbation singuliere d'un probleme de frottement sec non monotone", Apr. 11, 1997.*

(Continued)

*Primary Examiner* — Jean M Corrielus
(74) *Attorney, Agent, or Firm* — Strategic Patents, P.C.

(57) ABSTRACT

In embodiments of the present invention, improved capabilities are described for perturbing non-unique values may comprise finding the non-unique values in a data table, perturbing the non-unique values to render unique values, and using the non-unique values as an identifier for a data item.

12 Claims, 2 Drawing Sheets

U.S. PATENT DOCUMENTS

| | | | | |
|---|---|---|---|---|
| 7,010,523 | B2* | 3/2006 | Greenfield et al. | 1/1 |
| 7,133,865 | B1 | 11/2006 | Pedersen et al. | |
| 7,177,855 | B2 | 2/2007 | Witkowski et al. | |
| 7,239,989 | B2 | 7/2007 | Kothuri | |
| 7,269,517 | B2* | 9/2007 | Bondarenko | 702/19 |
| 7,333,982 | B2 | 2/2008 | Bakalash et al. | |
| 7,360,697 | B1 | 4/2008 | Sarkar et al. | |
| 7,490,052 | B2 | 2/2009 | Kilger et al. | |
| 7,493,308 | B1* | 2/2009 | Bair et al. | 1/1 |
| 7,499,908 | B2* | 3/2009 | Elnaffar et al. | 1/1 |
| 7,577,579 | B2 | 8/2009 | Watarai et al. | |
| 7,606,699 | B2 | 10/2009 | Sundararajan et al. | |
| 7,747,617 | B1* | 6/2010 | Bair et al. | 707/728 |
| 7,800,613 | B2 | 9/2010 | Hanrahan et al. | |
| 7,949,639 | B2 | 5/2011 | Hunt et al. | |
| 8,041,741 | B1* | 10/2011 | Bair et al. | 707/791 |
| 2002/0099598 | A1 | 7/2002 | Eicher, Jr. et al. | |
| 2002/0116213 | A1 | 8/2002 | Kavounis et al. | |
| 2002/0123945 | A1 | 9/2002 | Booth et al. | |
| 2003/0004779 | A1 | 1/2003 | Rangaswamy et al. | |
| 2003/0018513 | A1 | 1/2003 | Hoffman et al. | |
| 2003/0083947 | A1 | 5/2003 | Hoffman et al. | |
| 2003/0093340 | A1 | 5/2003 | Krystek et al. | |
| 2003/0126143 | A1 | 7/2003 | Roussopoulos et al. | |
| 2003/0158749 | A1 | 8/2003 | Olchanski et al. | |
| 2003/0233297 | A1 | 12/2003 | Campbell | |
| 2004/0210562 | A1 | 10/2004 | Lee et al. | |
| 2005/0060300 | A1 | 3/2005 | Stolte et al. | |
| 2005/0240577 | A1 | 10/2005 | Larson et al. | |
| 2006/0080294 | A1 | 4/2006 | Orumchian et al. | |
| 2006/0218157 | A1 | 9/2006 | Sourov et al. | |
| 2008/0033914 | A1 | 2/2008 | Chemiack et al. | |
| 2008/0147699 | A1 | 6/2008 | Kruger et al. | |
| 2008/0168027 | A1 | 7/2008 | Kruger et al. | |
| 2008/0168028 | A1 | 7/2008 | Kruger et al. | |
| 2008/0168104 | A1 | 7/2008 | Kruger et al. | |
| 2008/0256028 | A1 | 10/2008 | Kruger et al. | |
| 2008/0263065 | A1* | 10/2008 | West | 707/100 |
| 2008/0288889 | A1* | 11/2008 | Hunt et al. | 715/810 |
| 2008/0294996 | A1* | 11/2008 | Hunt et al. | 715/739 |
| 2008/0319829 | A1* | 12/2008 | Hunt et al. | 705/10 |
| 2009/0006490 | A1 | 1/2009 | Hunt et al. | |
| 2009/0018996 | A1* | 1/2009 | Hunt et al. | 707/2 |

OTHER PUBLICATIONS

Baron, S. et al., "The Challenges of Scanner Data", *The Journal of the Operational Research Society*; vol. 46(1), (Jan. 1995),50-61.

Guadagni, P. M., et al., "A logit model of brand choice calibrated on scanner data", *Marketing Science*, vol. 2 No. 3 (Summer 1983),203-238 pgs.

Bronnenberg, B. T., et al., "Unobserved Retailer Behavior in Multimarket Behavior",*Joint Spatial Dependence in Market Shares and Promotional Variables*, Marketing Science, 20, 3, ABI/INFORM Global,(Summer 2001),p. 284.

Swait, J. et al., "Enriching Scannel Panel Models with Choice Experiments", *Marketing Science*,22(4); ABI/INFORM Global, (Fall 2003),442-460 pgs.

Qian, J. et al., "Optimally Weighted Means in Stratified Sampling", amstat.org, (1994),863-866.

McCullock, R. et al., "An Exact Likelihood Analysis of the Multinomial Probit Model", *Journal of Econometrics*,vol. 64, (1994),207-240.

"U.S. Appl. No. 11/927,502, Non-Final Office Action mailed Jan. 8, 2009", 12 pgs.

"U.S. Appl. No. 11/927,550, Non-Final Office Action mailed Jan. 8, 2009", 12 pgs.

"U.S. Appl. No. 11/927,565, Non-Final Office Action mailed Jan. 9, 2009", 12 pgs.

Intl Searching Authority, "International Search Report", For US Patent Application No. PCT/US2008/052187, mailed on Oct. 30, 2008.

Intl Searching Authority, "International Search Report", For US Patent Application No. PCT/US2008/052195, mailed on Jun. 25, 2008.

"U.S. Appl. No. 11/927,528, Non-Final Office Action mailed Nov. 30, 2009", 11 pgs.

"U.S. Appl. No. 12/021,495, Non-Final Office Action mailed May 26, 2010", , 15.

"U.S. Appl. No. 12/021,268, Non-Final Office Action mailed Mar. 26, 2010", , 12.

"U.S. Appl. No. 11/927,515, Non-Final Office Action mailed Feb. 17, 2010", , 10 Pgs.

Fangyan, R. et al., "Spatial hierarchy and OLAP-favored search in spatial data warehouse", *Proceedings of the 6th ACM international workshop on Data warehousing and OLAP* New Orleans, Louisiana, USA Nov. 7-7, 2003 , 12.

Inderpa, S. M. et al., "Maintenance of data cubes and summary tables in a warehouse", *Proceedings of the 1997 ACM SIGMOD international conference on Management of data* Tucson, Arizona, United States May 11-15, , p. 100-111.

Malhotra, N. et al., "Marketing research in the new millennium: Emerging issues and trends", *Marketing Intelligence and Planning* vol. 19, No. 4. 2001 , 216-235 Pgs.

*Abilitec Product Brochure* pp. 108 2008 , 1-8.

*Acxiom Bureau Services Brochure* 2009 , 1-9.

"U.S. Appl. No. 12/021,227, Non-Final Office Action mailed Apr. 4, 2011", , 26.

"U.S. Appl. No. 12/021,495, Notice of Allowance mailed Mar. 24, 2011", , 9 pgs.

"U.S. Appl. No. 12/021,495, Final Office Action mailed Feb. 16, 2011", , 14.

Chaudhuri, Surajit "An overview of data warehousing and OLAP technology", *Surajit Chaudhuri, Umeshwar Dayal, An overview of data warehousing and OLAP technology, ACM SIGMOD Record*, v.26 n. 1, p. 65-74, Mar. 1997 , 65-74.

Chaudhuri, S. "Database technology for decision support systems", *Chaudhuri, S.; Dayal, U.; ganti, V.;* , *"Database technology for decision support systems,"* Computer, vol. 34, No. 12, pp. 48-55, Dec. 2001.

Colliat, George "OLAP, relational, and multidimensional database systems", *George Colliat, OLAP, relational, and multidimensional database systems, ACM SIGMOD Record*, v.25 n. 3, p. 64-69, Sep. 1996 , 64-69.

Dan, Briody "Matching Customer Buying Patterns online and offline poses challenges for Retailers", Infoworld, May 29, 2000 , 36.

Kamakura, Wagner A. Statistical Data Fusion for Cross-Tabulation,University of Pittsburgh,University of Groningen Mar. 12, 1996 , 1-34.

Kimball, Ralph "Why decision support fails and how to fix it", *Ralph Kimball, Kevin Strehlp, Why decision support fails and how to fix it, ACM Record*, v.24 n. 3, p. 92-97, Sep. 1995 , 92-97.

Shilakes, Christopher C. Enterprise Information Portals, Merrill Lynch, Enterprise Software Team Nov. 16, 1998 , 1-64.

web.archive.org, "Our Mission", PMGBenchmarking.com Sep. 18, 2000 , pp. 1.

"Webcasts", Web.archive.org, PMGBenchmarking.com Jun. 8, 2002 , 1-2.

web.archive.org, "Measure Your Performance", PMGBenchmarking.com Jun. 7, 2002 , pp. 1-3.

"Signals of Performance", Web.archive.org, PMGBenchmarking.com Jun. 2, 2002 , 1-2.

"The Performance Measurement Group Rolls out Product Development Benchmarking Series Online", PRTM Press release Jun. 11, 1999 , 1-2.

PRTM Press Release, "New Survey Addresses Product and Marketing Management", May 21, 1999 , 1.

PRTM Press Release, "Fujitsu and PRTM/PMG Announce Supply-Chain Benchmarking and Consulting Collaboration in Japan", Mar. 1, 1999 , 1.

PRTM Press Release, "High Tech Management Consultants PRTM Launch Online Benchmarking Company", Mar. 1, 1999 , 1-2.

web.archive.org, "Supply-Chain Management Benchmarking Series—Tips & Slips", vol. 4: Subscriber Site Navigation PMGBenchmarking.com, vol. 4: Subscriber Site Navigation Feb. 8, 2011 , pp. 1-11.

"SAP Partnership—Product Offerings and Credentials", Web.archive.org, PMGBenchmarking.com Feb. 8, 2001 , 1.

"Supply-Chain Management Benchmarking Series—Tips & Slips, vol. 3: Plan Survey FAQ's", Web.archive.org, PMGBenchmarking.com Feb. 8, 2001, 1-6.

web.archive.org, "Supply-Chain Management Benchmarking Series vol. 2", PMGBenchmarking.com Feb. 8, 2001, 1-3.

"SAP Partnership—a research note published by AMR on the PMG/SAP Alliance", Web.archive.org, PMGBenchmarking.com Feb. 10, 2001, all.

web.archive.org, "SAP Partnership—Continuous Performance Assessments", PMGBenchmarking.com Continuous Performance Assessments Feb. 10, 2001, pp. 1.

"SAP Partnership—Peformance Snapshots", Web.archive.org, PMGBenchmarking.com Feb. 10, 2001, 1-2.

"Product Development Benchmarking Series", Web.archive.org, PMGBenchmarking.com Dec. 6, 2000, 1-2.

web.archive.org, "SAP Partnership", PMGBenchmarking.com Dec. 6, 2000, 1.

"Supply-Chain Management Benchmarking Series", Web.archive.org, PMGBenchmarking.com Dec. 6, 2000, 1-2.

"Supply-Chain Management and Product Development Benchmarking Series", Web.archive.org, PMGBenchmarking.com Dec. 5, 2000, 1-2.

"Supply Chain Letter", Web.archive.org, supply-chain.org Dec. 5, 1998, 1-12.

web.archive.org, "Questions frequently asked by development professionals considering a subscriptions to the Product Development Benchmarking Series", PMGBenchmarking.com Oct. 6, 2000, pp. 1-4.

"SAP and PMG Introduce Industry-specific Key Performance Indicators for Supply-Chain Operations", PRTM Press Release Jan. 31, 2000, 1-2.

PRTM Press Release, "University of Michigan/OSAT and the Performance Measurment Group Launch a new Benchmarking Initiative for the Automotive Industry", Jan. 21, 2000, 1-2.

"Improving performance and cutting costs", Strategic Direction, v16n1 Jan. 2000, 1-4.

"Industry standard benchmarking program", SAP Press release Jan. 20, 2000, 1.

"Benchmarking Studies by PRTM", Web.archive.org, prtm.com Jan. 17, 1998, 1-4.

Dimensions: Executive Summary, "The Performance Measurement Group", Jul. 2000, pp. 1-4.

"Supply-Chain Management Benchmarking Series vol. 1", Web.archive.org, PMGBenchmarking.com Feb. 8, 2001, 1-5.

"U.S. Appl. No. 12/021,916, Non-Final Office Action mailed Jul. 25, 2011", , 40.

"A framework for evaluating privacy preserving data mining algorithms", [PDF] from aau.dk,E Bertino, IN Fovino . . . —Data Mining and Knowledge . . . ,2005—Springer.

"Achieving privacy preservation when sharing data for clustering[PDF] from pp.ua S Oliveira", Secure Data Management, 2004 Springer.

"U.S. Appl. No. 12/021,227, Final Office Action mailed Dec. 2, 2011", , 18.

"U.S. Appl. No. 12/021,916, Final Office Action mailed Mar. 13, 2012, 00-00-00".

"On the design and quantification of privacy preserving data mining algorithms[PDF] from utdallas.", edu D Agrawal . . . —Proceedings of the twentieth ACM SIGMOD— . . . ,2001—dl.acm.org.

"Personalized privacy preservation[PDF] from sabanciuniv.edu X", Xiao . . . —Proceedings of the 2006 ACM SIGMOD international . . . ,2006—dl.acm.org.

"Protecting Consumer Data in Composite Web Services[PDF] from rmit.edu.au", C Pearce, P Bertok . . . —Security and Privacy in the Age of . . . , 2005—Springer.

"State-of-the-art in privacy preserving data mining", [PDF] from sigmod.org VS Verykios, E Bertino, IN Fovino . . . —ACM Sigmod . . . ,2004—dl.acm.org.

"The applicability of the perturbation based privacy preserving data mining for real-world data[PDF] from utdallas.edu L Liu, M", Kantarcioglu . . . —Data & Knowledge Engineering, 2008—Elsevier.

"U.S. Appl. No. 12/021,916, Non-Final Office Action mailed Apr. 12, 2013", 22 pages.

* cited by examiner

DATA PERTURBATION OF NON-UNIQUE VALUES

CROSS-REFERENCE TO RELATED APPLICATIONS

This application claims the benefit of the following provisional application, which is hereby incorporated by reference in its entirety: App. No. 60/886,798 filed on Jan. 26, 2007 and entitled "A Method of Aggregating Data."

BACKGROUND

1. Field

This invention relates to methods and systems for aggregating data, and more specifically, to perturbing data, such as values in a table, so as to decrease the time it takes to aggregate data.

2. Description of Related Art

OLAP applications provide an analysis of data from a data warehouse. One step in providing this analysis may involve aggregating the data, such as into data cubes or data hypercubes. Unfortunately, the process of aggregating data can be relatively slow, and users may be kept waiting while an aggregation is being produced. There is, therefore, a need for a method that accelerating the process of aggregating data from a data warehouse or datamart.

SUMMARY

The methods disclosed herein include methods for perturbing non-unique values. A method for perturbing the non-unique values may comprise finding the non-unique values in a data table. The method may further comprise perturbing the non-unique values to render unique values and using the non-unique values as an identifier for a data item.

A method for perturbing the non-unique values may comprise finding the non-unique values in a fact data table. In the method, the fact data table may be a retail sales dataset, a syndicated sales dataset, point-of-sales dataset, a syndicated causal dataset, an internal shipment dataset, and an internal financial dataset. In embodiments, the syndicated sales dataset may be a scanner dataset, an audit dataset, and a combined scanner-audit dataset. The method may further comprise perturbing the non-unique values to render unique values and using the non-unique values as an identifier for a data item.

A method for perturbing the non-unique values may comprise finding the non-unique values in a dimension data table. In the method, the dimension may be a hierarchy, a category, a data segment, a time, a venue, geography, demography, a behavior, a life stage, and a consumer segment. The method may further comprise perturbing the non-unique values to render unique values and using the non-unique values as an identifier for a data item.

A method for perturbing the non-unique values may comprise associating an availability condition with a data perturbation action. The availability condition may be used to assess permission to perform the data perturbation action. In the method and system, the availability condition may be based on a statistical validity, a sample size, permission to release data, qualification of an individual to access the data, the type of data, the permissibility of access to combinations of the data, and a position of the individual within an organization. The method may further comprise permitting the data perturbation action when the data perturbation action is not forbidden by the availability condition. Further, the method may comprise finding the non-unique values in a data table, perturbing the non-unique values to render unique values, and using the non-unique values as an identifier for a data item.

These and other systems, methods, objects, features, and advantages of the present invention will be apparent to those skilled in the art from the following detailed description of the preferred embodiment and the drawings. Capitalized terms used herein (such as relating to titles of data objects, tables, or the like) should be understood to encompass other similar content or features performing similar functions, except where the context specifically limits such terms to the use herein.

BRIEF DESCRIPTION OF THE FIGURES

The invention and the following detailed description of certain embodiments thereof may be understood by reference to the following figures.

DETAILED DESCRIPTION

Figure 1:
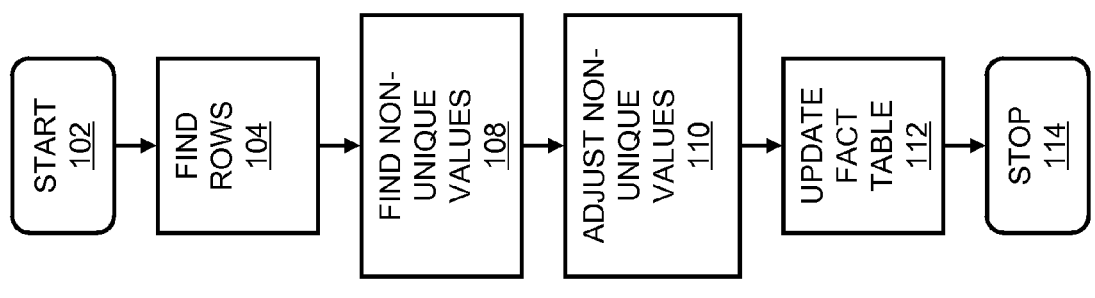
FIG. 1 provides a logical flow diagram for perturbing a fact table.

An aspect of the present invention involves an OLAP application producing an aggregation of data elements from one or more tables, such as fact tables and/or dimension tables, wherein the aggregation includes at least one non-aggregated dimension. Unlike a fixed OLAP cube structure, this non-aggregated dimension may be queried dynamically. The dimension may be associated with hierarchical, categorical information. In embodiments, a fact table may encompass a Cartesian product or cross join of two source tables. Thus, the fact table may be relatively large. In some embodiments, one of the source tables may itself consist of a fact table (e.g., a database table comprising tuples that encode transactions of an enterprise) and the other source table may consist of a projection table (e.g., a database table comprising tuples that encode projections related to the enterprise). In any case, the aggregation may comprise a data cube or data hypercube, which may consist of dimensions drawn from the fact table of which the aggregation is produced, wherein the dimensions of the fact table may be associated with the fact table's columns.

In applications, a user of the OLAP application may engage the application in a data warehouse activity. This activity may comprise processing a query and producing an analysis of data. This data may reside in an aggregation that the OLAP application produces. The size and/or organization of the aggregation may result in a relatively long query processing time, which the user may experience during the data warehouse activity.

An aspect of the present invention may be to reduce the query processing time that the user experiences. One approach to reducing this query processing time may involve a pre-computing step. This step may involve pre-calculating the results of queries to every combination of information category and/or hierarchy of the aggregation. Alternatively or additionally, this step may involve pre-aggregating data so as to avoid the cost of aggregating data at query time. In other words, the OLAP application may utilize computing time and data storage, in advance of the user's data warehouse activity, to reduce the query processing time that the user experiences.

Another approach to reducing the query processing time that the user experiences may involve perturbing values in a fact table so that all values within a particular column of the fact table are unique. Having done this, an aggregating query may be rewritten to use a relatively fast query command. For example, in a SQL environment, with unique values in a particular column of a fact table, a SQL DISTINCT command may be used, instead of a relatively slow SQL CROSS JOIN command, or the like. This rewriting of fact table values may reduce the query processing time that it takes to execute the aggregating query, optionally without the relatively costly step of pre-aggregating data.

An aspect of the present invention may be understood with reference to the following example, which is provided for the purpose of illustration and not limitation. This example deals with queries that provide flexibility with respect to one dimension, but it will be appreciated that the present invention supports flexibility with respect to more than one dimension. Given a sales fact table (salesfact) including venue, item, and time dimensions and a projection fact table (projection) including venue, time, and venue group dimensions, and given that each sales fact in the fact table contains actual sales data and each fact in the projection table contains a projection weight to be applied to actual sales data so as to produce projected sales information, then the following query may produce a projected sales calculation and perform a distribution calculation. (In OLAP, a distribution calculation may happen when two fact tables are used to scope each other and one table has a higher cardinality than the other.):

```
SELECT
venue_dim_key,
item_dim.attr1_key,
sum (distinct projection.projectedstoresales),
sum (projection.weight * salesfact.sales)
FROM salesfact, projection, item_dim, time_dim
WHERE (
    // 13 weeks of data
    (time_dim.qtr_key = 11248)
    // break out the 13 weeks
    AND (salesfact.time_dim_key = time_dim.time_dim_key)
    // join projection and salesfact on venue_dim_key
    AND (projection.venue_dim_key = salesfact.venue_dim_key)
    // join projection and salesfact on time_dim_key
    AND (projection.time_dim_key = salesfact.time_dim_key)
    // break out a group of venues
    AND (projection.venue_group_dim_key = 100019999)
    // some product categories
    AND (item_dim.attr1_key in (9886))
    // break out the items in the product categories
    AND (item_dim.item_dim_key = salesfact.item_dim_key))
GROUP BY venue_dim_key, item_dim.attr1_key
```

This example query adds up projected store sales for the stores that have sold any item in category 9886 during a relevant time period. Assuming that the data in the projection fact table is perturbed so that the values in projection.projectedstoresales are unique, the expression sum (distinct projection.projectedstoresales) is sufficient to calculate the total projected sales for all of the stores that have sold any of those items during the relevant period of time.

As compared with operating on data that is not perturbed (an example of this follows), it will be appreciated that perturbing data in advance of querying the data provides this improved way to scrub out the duplications. This appreciation may be based on the observation that it is likely that multiple sales fact rows will be selected for each store. In tabulating the projected store sales for the stores that have any of the selected items sold during the relevant time period, each store should be counted only once. Hence the combination of first perturbing the data and then using the distinct clause. Moreover, if overlapping venue groups have the same stores, the above query also works. It follows that analogous queries may work with multiple time periods, multiple product attributes, and multiple venue groups. Such queries will be appreciated and are within the scope of the present disclosure.

In contrast if the data is not perturbed and so it is not guaranteed that the values in projection.projectedstoresales are unique, then the following sequence of queries may be required:

First:

```
CREATE TABLE store_temp AS SELECT
projection.venue_dim_key,
projection.time_dim_key,
item_dim.attr1_key,
min(projectedstoresales)
FROM salesfact, projection, item_dim, time_dim
WHERE (
    // 13 weeks of data
    (time_dim.qtr_key = 11248)
    // break out the 13 weeks
    AND (salesfact.time_dim_key = time_dim.time_dim_key)
    // join projection and salesfact on venue_dim_key
    AND (projection.venue_dim_key = salesfact.venue_dim_key)
    // join projection and salesfact on time_dim_key
    AND (projection.time_dim_key = salesfact.time_dim_key)
    // break out a group of venues
    AND (projection.venue_group_dim_key = 100019999)
    // some product categories
    AND (item_dim.attr1_key in (9886))
    // break out the items in the product categories
    AND (item_dim.item_dim_key = salesfact.item_dim_key))
GROUP BY time_dim_key, venue_dim_key, item_dim.attr1_key
```

Second, apply a measure to calculate the distribution itself:

```
SELECT sum(projectedstoresales) FROM store_temp group by
venue_dim_key, item_dim.attr1_key
```

Finally, an additive part of the measure is required:

```
SELECT sum (projection.weight * salesfact.sales)
FROM salesfact, projection, item_dim, time_dim
WHERE (
    // 13 weeks of data
    (time_dim.qtr_key = 11248)
    // break out the 13 weeks
    AND (salesfact.time_dim_key = time_dim.time_dim_key)
    // join projection and salesfact on venue_dim_key
    AND (projection.venue_dim_key = salesfact.venue_dim_key)
    // join projection and salesfact on time_dim_key
    AND (projection.time_dim_key = salesfact.time_dim_key)
    // break out a group of venues
    AND (projection.venue_group_dim_key = 100019999)
    // some product categories
    AND (item_dim.attr1_key in (9886))
    // break out the items in the product categories
    AND (item_dim.item_dim_key = salesfact.item_dim_key))
GROUP BY venue_dim_key, item_dim.attr1_key
DROP TEMP TABLE store_temp
```

It will be appreciated that join explosions can result in the temporary table store_temp when a lot of attribute combinations are required for the query. For example, increasing the number of time periods, product attributes, and/or venue groups will multiply the number of records in the temporary table. Conversely, the perturbed data join of the present invention is not affected by this problem since both dimensions can be processed as peers even though the projection table has no key for the item dimension.

Referring to FIG. 1, a logical process 100 for perturbing a fact table is shown. The process begins at logical block 102 and may continue to logical block 104, where the process may find all of the rows in a fact table that match a targeted dimension member or value (subject, perhaps, to a filter). The process may continue to logical block 108, where the process may determine non-unique column values within those rows. Then, processing flow may continue to logical block 110 where an epsilon (possibly different if there are matching non-unique values) or other relatively small value may be added or subtracted to each of the non-unique values in such a manner as to render any and all of the column values to be unique. Next, processing flow may continue to logical block 112, where the values that were modified in the previous step are updated in the fact table so that the fact table contains the updated values. Finally, processing flow continues to logical block 114, where the procedure ends.

In an embodiment, this logical process 100 may speed up affected queries by allowing for a SQL DISTINCT clause to be used, instead of an extra join that would otherwise be needed to resolve the identical column values. In an embodiment, this process 100 may make it possible to use leaf-level data for hierarchical aggregation in OLAP applications, rather than using pre-aggregated data in such applications.

Figure 2:
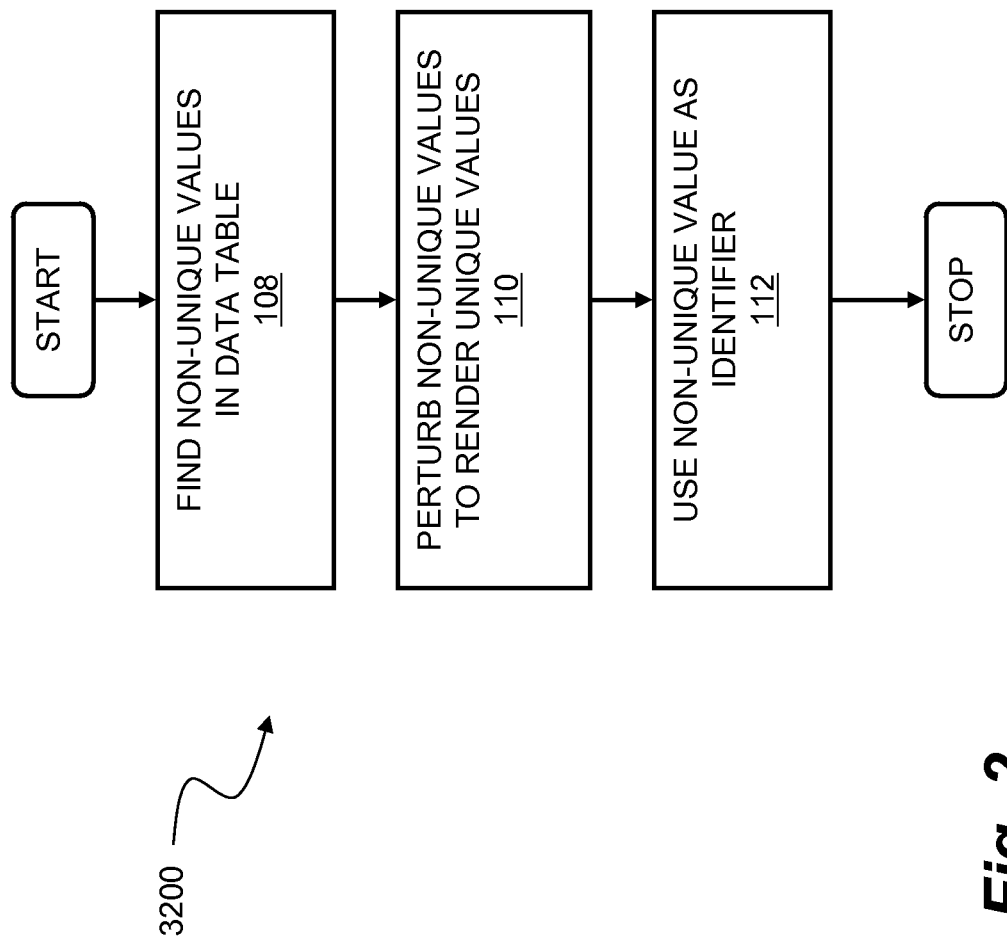
FIG. 2 depicts data perturbation of non-unique values.

Referring to FIG. 2, a logical process 3200 for creating a data perturbation dataset is shown. The process begins at logical block 3202 where the process may find a non-unique value in a data table. Next, the non-unique values may be perturbed to render unique values 3204. In embodiments, the non-unique value may be used as an identifier 3208.

In embodiments, a permission to perform a data perturbation action may be based on the availability condition. A process may permit the data perturbation action if the data perturbation action is not forbidden by the availability condition.

In embodiments, the data table may be a fact data table. In embodiments, the fact data table may encompass a Cartesian product or cross join of two source tables. Therefore, the fact table may be relatively large.

In embodiments, the fact data table may be a retail sales dataset. In other embodiments, the fact data table may be a syndicated sales dataset.

In embodiments, the syndicated sales dataset is a scanner dataset.

In embodiments, the syndicated sales dataset is an audit dataset.

In embodiments, the syndicated sales dataset is a combined scanner-audit dataset.

In an embodiment, the fact data table may be a point-of-sale data.

In an embodiment, the fact data table may be a syndicated causal dataset.

In an embodiment, the fact data table may be an internal shipment dataset.

In an embodiment, the fact data table may be an internal financial dataset.

In embodiments, the data table may be a dimension data table. In an embodiment, the dimension may a hierarchy.

In an embodiment, the fact data table may be a category.

In an embodiment, the fact data table may be a data segment.

In an embodiment, the fact data table may be a time.

In an embodiment, the fact data table may be a venue.

In an embodiment, the fact data table may be geography.

In an embodiment, the fact data table may be demography.

In an embodiment, the fact data table may be a behavior.

In another embodiment, the fact data table may be a life stage.

In yet another embodiment, the fact data table may be a consumer segment.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method for performing an aggregating query based on distinctness of data values in a target dimension by ensuring uniqueness of each data item in the target dimension, the method comprising:

finding a non-unique value in a dimension of a data table of the relational database, wherein the data table includes a fact table and the dimension contains numeric values;

perturbing the non-unique value by a small amount to render a perturbed instance of the non-unique value that is unique in the dimension of the data table;

replacing the non-unique value with the perturbed instance;

repeating the above steps to provide a perturbed data table consisting of unique values in the dimension; and performing an aggregating query of the perturbed data table in the relational database using an SQL DISTINCT command in place of a join command.

2. The method of claim 1 wherein the data table includes sales data collected at a point of sale.

3. The method of claim 1 wherein the data table includes information collected from a panel of consumers.

4. The method of claim 1 wherein the data table includes survey data from a consumer survey.

5. The method of claim 1 wherein the data table includes data from a loyalty program.

6. The method of claim 1 wherein the data table includes data related to a sales projection.

7. A computer program product for performing an aggregating query based on distinctness of data values in a target dimension by ensuring uniqueness of each data item in the target dimension, the computer program product comprising computer executable code embodied in a non-transitory computer readable medium that, when executing on one or more computing devices, performs the steps of:

finding a non-unique value in a dimension of a data table of the relational database, wherein the data table includes a fact table;

perturbing the non-unique value by a small amount to render a perturbed instance of the non-unique value that is unique in the dimension of the data table;

replacing the non-unique value with the perturbed instance;

repeating the above steps to provide a perturbed data table consisting of unique values in a dimension; and performing an aggregating query of the perturbed data table in the relational database using an SQL DISTINCT command in place of a join command.

8. The computer program product of claim 7 wherein the data table includes sales data collected at a point of sale.

9. The computer program product of claim 7 wherein the data table includes information collected from a panel of consumers.

10. The computer program product of claim 7 wherein the data table includes survey data from a consumer survey.

11. The computer program product of claim 7 wherein the data table includes data from a loyalty program.

12. The computer program product of claim 7 wherein the data table includes data related to a sales projection.

* * * * *